US011202260B2

(12) United States Patent
Huang et al.

(10) Patent No.: US 11,202,260 B2
(45) Date of Patent: *Dec. 14, 2021

(54) POWER MANAGEMENT MODE TRANSITION FOR WAKE UP RECEIVER

(71) Applicant: Intel Corporation, Santa Clara, CA (US)

(72) Inventors: Po-Kai Huang, San Jose, CA (US); Minyoung Park, San Ramon, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/551,894

(22) Filed: Aug. 27, 2019

(65) Prior Publication Data

US 2020/0008149 A1     Jan. 2, 2020

Related U.S. Application Data

(63) Continuation of application No. 15/692,513, filed on Aug. 31, 2017, now Pat. No. 10,433,253.
(Continued)

(51) Int. Cl.
*H04W 52/02* (2009.01)
*G06F 1/3209* (2019.01)
(Continued)

(52) U.S. Cl.
CPC ...... *H04W 52/0229* (2013.01); *G06F 1/3209* (2013.01); *H04W 52/028* (2013.01);
(Continued)

(58) Field of Classification Search
CPC ......... H04W 52/0229; H04W 52/0216; H04W 52/028; H04W 52/0212; H04W 28/06;
(Continued)

(56) References Cited

U.S. PATENT DOCUMENTS 10,433,253 B2 * 10/2019 Huang ............. H04W 52/0229
2014/0112224 A1     4/2014 Jafarian et al.
(Continued)

FOREIGN PATENT DOCUMENTS

WO     WO-2018086357 A1     5/2018

OTHER PUBLICATIONS

U.S. Appl. No. 15/692,513 U.S. Pat. No. 10,433,253, filed Aug. 31, 2017, Power Management Mode Transition for Wake Up Receiver.
(Continued)

*Primary Examiner* — Steven H Nguyen
(74) *Attorney, Agent, or Firm* — Schwegman Lundberg & Woessner, P.A.

(57) ABSTRACT

Methods, apparatus, and computer-readable media are described to encode, by a first station, duty cycle timing for transmission to a second station via a primary connectivity radio. A wake-up radio (WUR) receiver (WURx) is enabled to receive a transmission based upon the duty cycle timing of the WURx when the primary connectivity radio is in a doze state from a perspective of the second station. A wake-up packet, received from the second station, is decoded and received by the WURx. The WURx receives a WURx transmission when in an WURx awake state. The primary connectivity radio is enabled based upon decoding the wake-up packet.

18 Claims, 12 Drawing Sheets

Related U.S. Application Data

(60) Provisional application No. 62/461,646, filed on Feb. 21, 2017, provisional application No. 62/484,461, filed on Apr. 12, 2017.

(51) Int. Cl.
  *G06F 1/3234* (2019.01)
  *H04W 28/06* (2009.01)

(52) U.S. Cl.
  CPC ... *H04W 52/0212* (2013.01); *H04W 52/0216* (2013.01); *G06F 1/3243* (2013.01); *H04W 28/06* (2013.01); *Y02D 30/70* (2020.08)

(58) Field of Classification Search
  CPC ..... G06F 1/3209; G06F 1/3243; Y02D 30/70; Y02D 10/00
  See application file for complete search history.

(56) References Cited

U.S. PATENT DOCUMENTS

| | | |
|---|---|---|
| 2014/0112226 A1 | 4/2014 | Jafarian et al. |
| 2014/0112229 A1 | 4/2014 | Merlin et al. |
| 2014/0211678 A1 | 7/2014 | Jafarian et al. |
| 2014/0254349 A1 | 9/2014 | Jia et al. |
| 2016/0277170 A1 | 9/2016 | Jia et al. |
| 2016/0374021 A1 | 12/2016 | Alpman et al. |
| 2017/0332327 A1* | 11/2017 | Fang ................... H04L 5/0007 |
| 2018/0206193 A1* | 7/2018 | Adachi ............ H04W 52/0235 |
| 2018/0206214 A1* | 7/2018 | Bendlin ............. H04W 72/042 |
| 2018/0234918 A1 | 8/2018 | Asterjadhi et al. |
| 2018/0242248 A1 | 8/2018 | Huang et al. |
| 2018/0295595 A1 | 10/2018 | Shellhammer et al. |
| 2019/0364503 A1* | 11/2019 | Kasslin ................. H04W 52/02 |
| 2020/0015166 A1* | 1/2020 | Ahn .................. H04W 52/0235 |
| 2020/0084720 A1* | 3/2020 | Marin ............... H04W 52/0206 |
| 2021/0006320 A1* | 1/2021 | Chang .................. H04B 7/0617 |

OTHER PUBLICATIONS

"U.S. Appl. No. 15/692,513, Non Final Office Action dated Feb. 27, 2019", 10 pgs.

"U.S. Appl. No. 15/692,513, Notice of Allowance dated May 20, 2019", 8 pgs.

"U.S. Appl. No. 15/692,513, Response filed Apr. 29, 2019 to Non Final Office Action dated Feb. 27, 2019", 12 pgs.

* cited by examiner

POWER MANAGEMENT MODE TRANSITION FOR WAKE UP RECEIVER

PRIORITY CLAIM

This application is a continuation of U.S. patent application Ser. No. 15/692,513, filed Aug. 31, 2017, which claims priority to U.S. Provisional Patent Application Ser. No. 62/461,646, filed Feb. 21, 2017, entitled "WAKE UP RECEIVER STATE TRANSITION"; and U.S. Provisional Patent Application Ser. No. 62/484,461, filed Apr. 12, 2017, entitled "POWER MANAGEMENT MODE TRANSITION FOR WAKE UP RECEIVER" all of which are incorporated herein by reference in their entirety.

FIELD OF THE DISCLOSURE

Various embodiments generally may relate to the field of wireless communications. Some embodiments relate to wireless local area networks (WLANs) and Wi-Fi networks including networks operating in accordance with the IEEE 802.11 family of standards. Some embodiments relate to IEEE 802.11ax and/or a low power communications standards, e.g., Bluetooth. Some embodiments relate to methods, computer readable media, and apparatus for power management mode transition for a wake-up receiver (WURx).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DESCRIPTION

Figure 1:
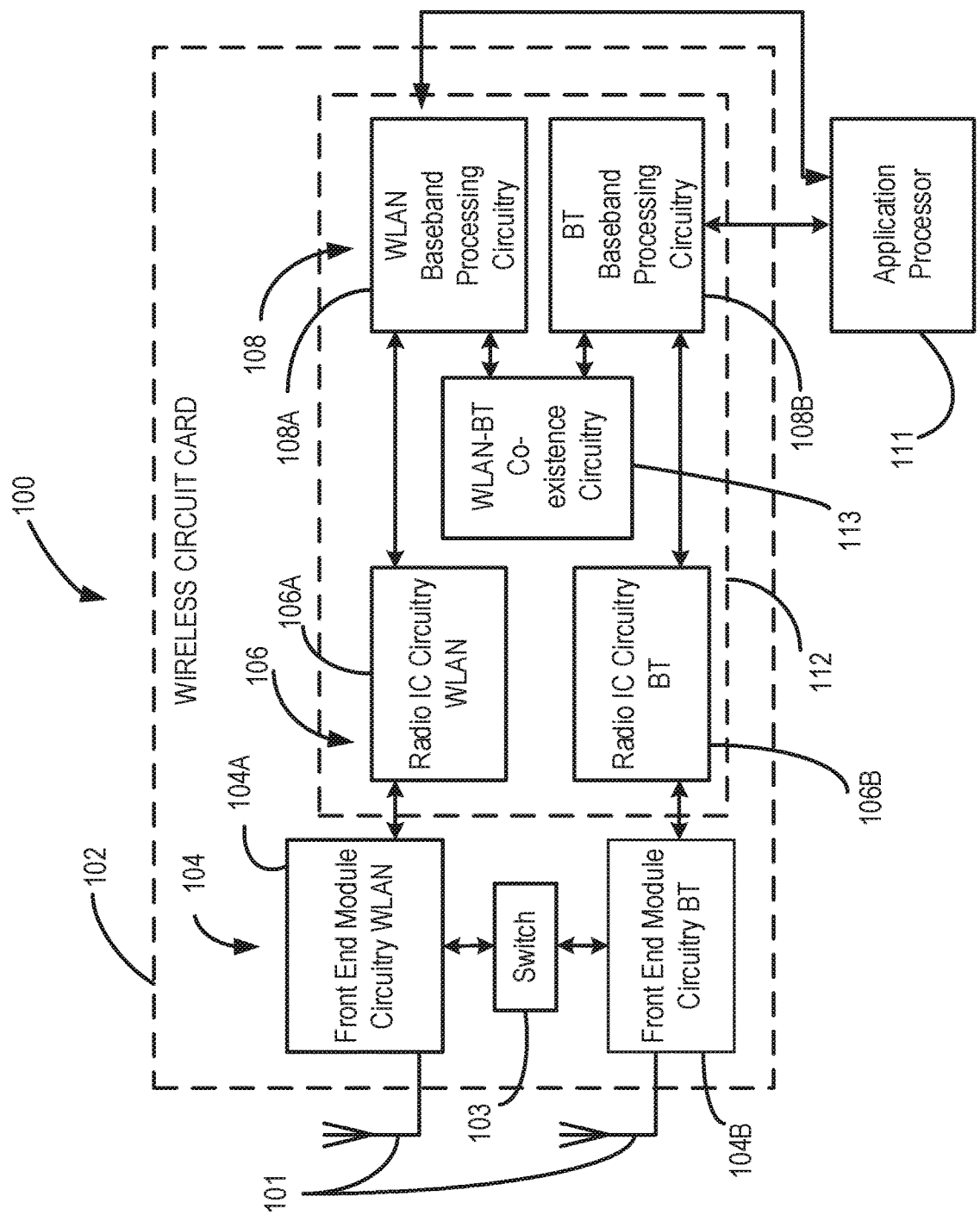
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 102, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, IEEE 802.11-2016, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link.

In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
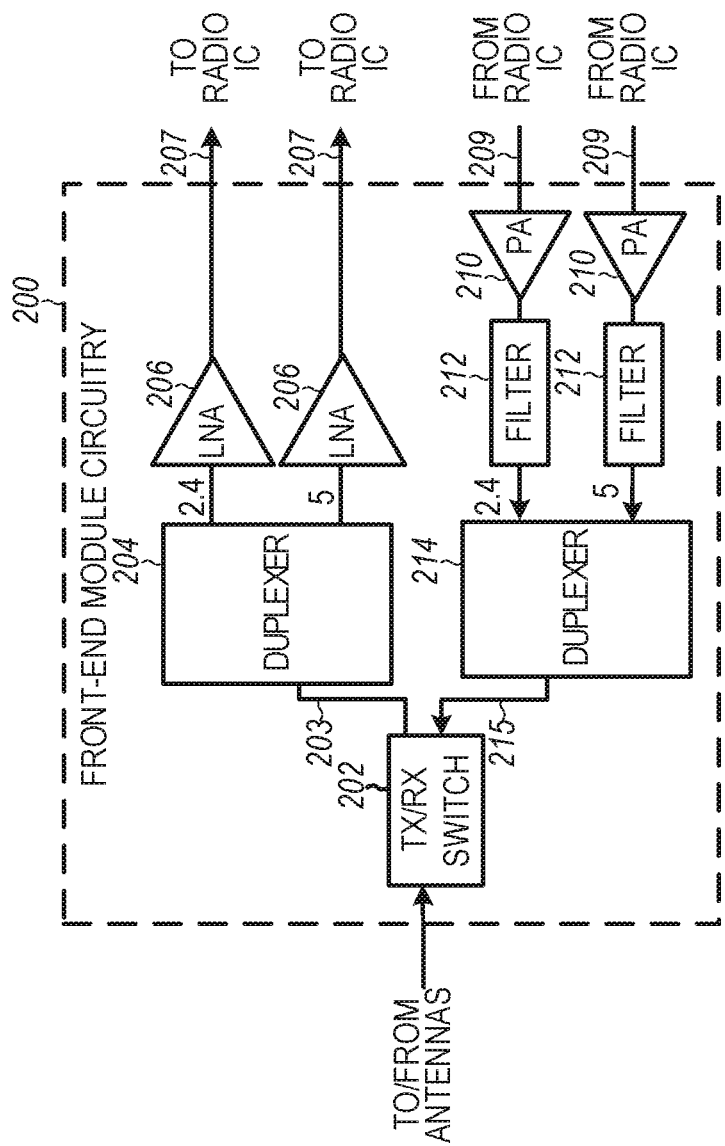
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
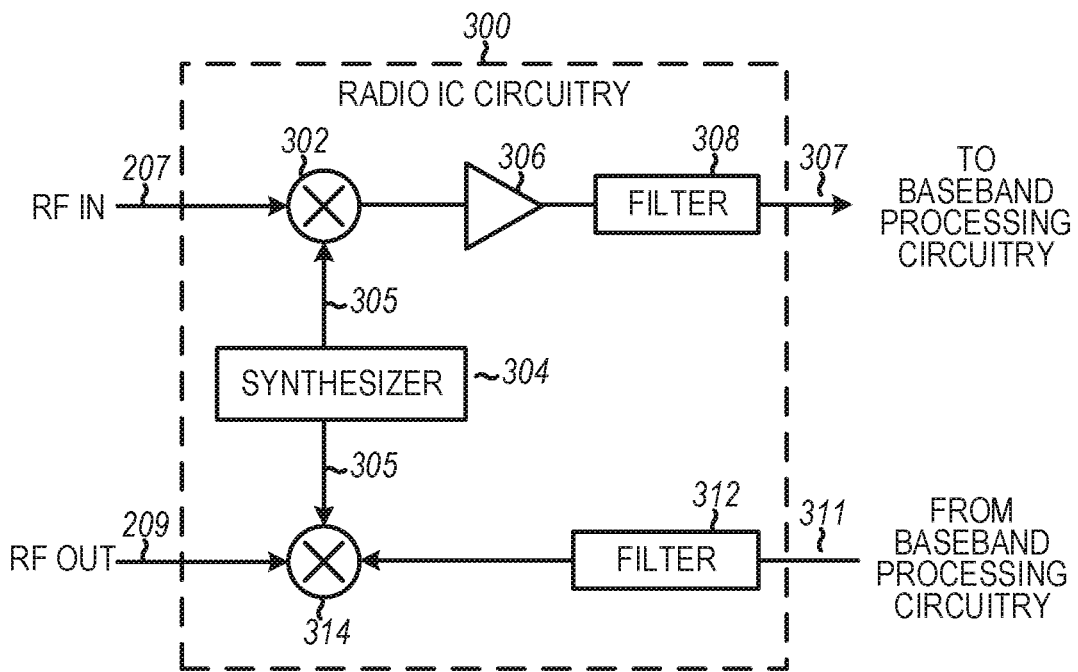
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-noise amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
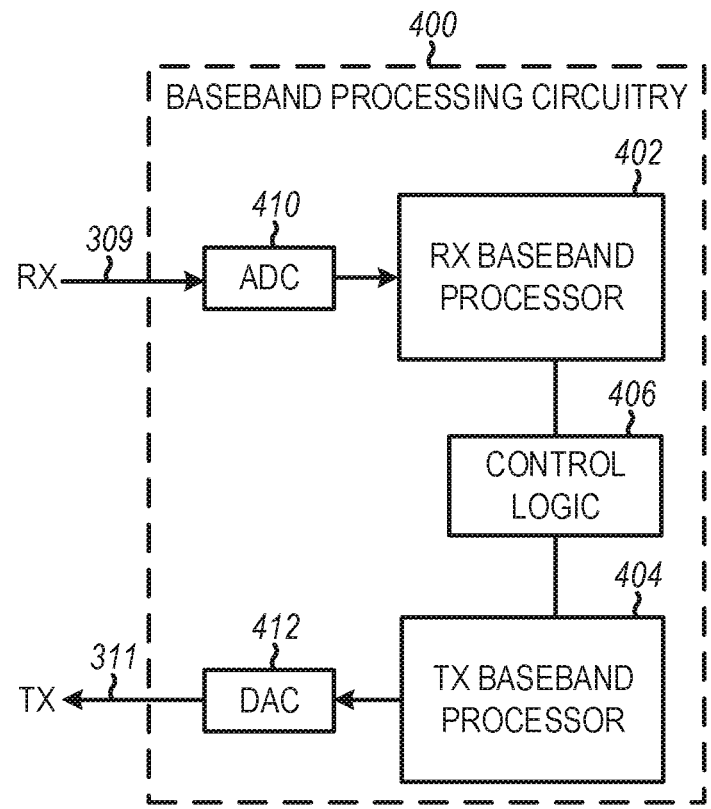
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
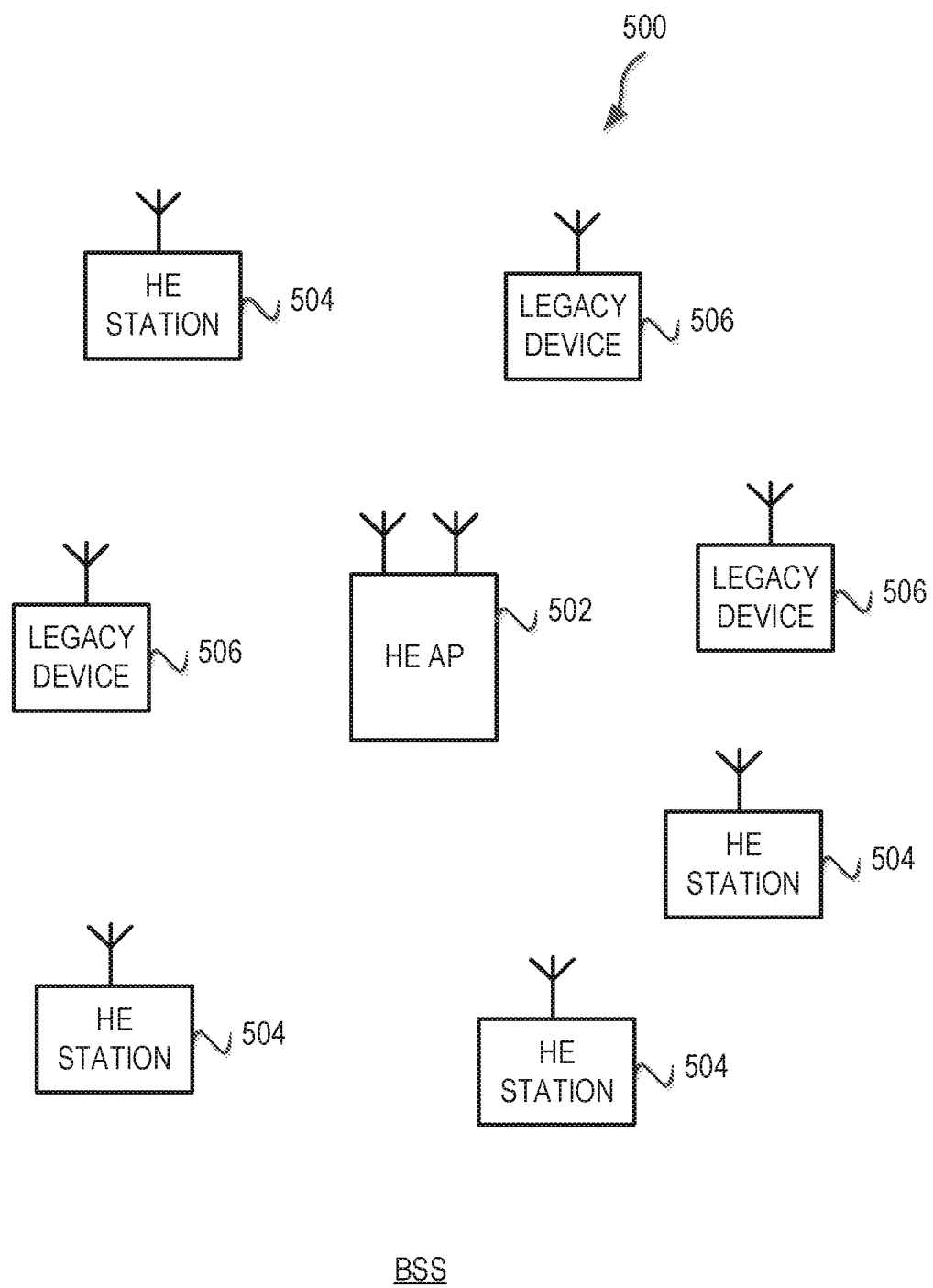
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2x996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments, the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-14.

In example embodiments, the HE station 504 and/or the HE AP 502 are configured to perform the methods and operations/functions described herein in conjunction with FIGS. 1-14. In example embodiments, an apparatus of the HE station 504 and/or an apparatus of the HE AP 502 are configured to perform the methods and functions described herein in conjunction with FIGS. 1-14. The term Wi-Fi may refer to one or more of the IEEE 802.11 communication standards. AP and STA may refer to HE access point 502 and/or HE station 504 as well as legacy devices 506.

In some embodiments, a HE AP 502 or a HE STA 504 performing at least some functions of an RE AP 502 may be referred to as RE AP STA. In some embodiments, a HE STA 504 may be referred to as a HE non-AP STA. In some embodiments, a HE STA 504 may be referred to as either a HE AP STA and/or HE non-AP.

Figure 6:
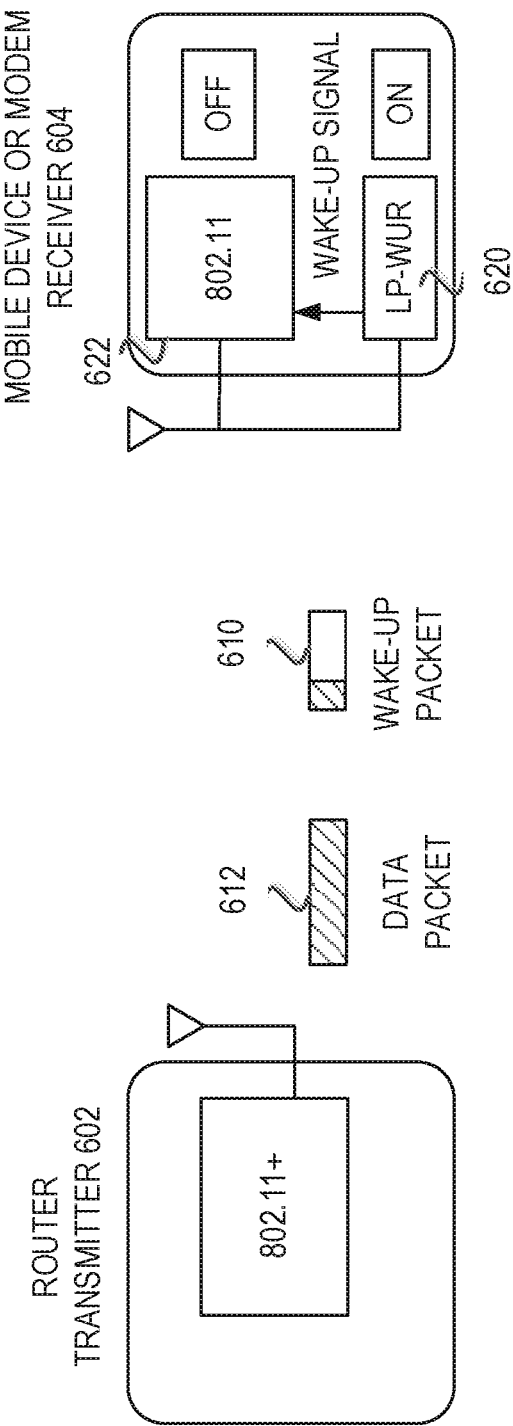
FIG. 6 illustrates an example of a low power wake-up receiver (LP-WUR) for a Wi-Fi device, in accordance with some embodiments.

In some embodiments, a low power wake up receiver (LP-WUR) enables an ultra-low power mode of operation for a Wi-Fi device. In some embodiments, systems/devices/methods described below provide for a device to have a minimum radio configuration that can receive a wake-up packet from a peer. Once the wake-up packet is received, the device may wake up a transceiver, e.g., a primary connectivity radio, that may be used to send and receive data. Hence, the device can stay in low power mode until receiving the wake-up packet. An example system including a Wi-Fi, i.e., (802.11) device is shown in FIG. 6 which illustrates an example of a low power wake-up receiver (LP-WUR) 620 for Wi-Fi, e.g. (IEEE 802.11) device 604, in accordance with some embodiments. The device 604 includes the LP-WUR 620 as well as a primary connectivity radio 622. The device 604 may operate in a low power mode where the primary connectivity radio 622 is powered off. In some embodiments, the state of the primary connectivity radio 622, as viewed from a transmitter 602, is off in the low power mode. The primary connectivity radio 622 may send and receive data while the device 604 is in low power mode.

In an example, when the transmitter 602 wants to wake up the device 604, the transmitter sends a wake-up packet 610 to the LP-WUR 620. Upon receipt, the LP-WUR sends a wake-up signal to a controller or directly to the primary connectivity radio 622. The primary connectivity radio 622 may then power up to be able to receive data, e.g., a data packet 612. In an example, the wake-up packet 610 may be sent based upon a duty cycle or based upon when the transmitter 602 needs to send data to the device 604.

In some embodiments, systems/devices/methods described herein may provide additional signaling to indicate the wake-up receiver (WURx) state transition, which can be independent of the existing transition for power states and power management modes. The WURx may operate in various power management modes that may be used to determine the state of the WURx. In an example, the WURx state may be always on or in duty-cycle mode. In duty-cycle mode, the WURx cycles between being active for a period of time and inactive for a period of time. Additional signaling may be introduced from the STA to AP to indicate the transition of power management mode and/or WURx state.

The different power management modes for the WURx, may have different corresponding rules for the WURx state transition. In an example, the rules may follow the definition of power management mode for an 802.11 radio. In an example, the WURx state transition is viewed from the AP's perspective and may not be the actual WURx state of the STA since the STA may go through localized operation of WURx state.

In various example, a STA can be in one of two power states: awake or doze. In the awake state, the STA is fully powered. For example, the primary connectivity radio may be fully powered to send/receive data. The WURx, however, may be powered off in the awake state. In the doze state, the primary connectivity radio may be powered off. From the perspective of the AP, the AP assumes the STA is not able to send or receive data, other than receive a wake-up packet.

A non-AP STA can be in one of two power management modes: active mode or power save mode. In the active mode, the STA may receive and transmit frames at any time. In active mode, the STA remains in the awake state. In the power save mode, the STA enters the awake state to receive or transmit data/frames. The STA returns and remains in the doze state, otherwise.

In various embodiments, the AP has the capability to send the wake-up packet to the WURx of the STA to wake up the primary connectivity radio of the STA. The concept, however, may be extended to the general device to device model, where STA1 has the capability to send the wake-up packet to the WURx of the STA2 to wake up the primary connectivity radio of the STA2.

In some embodiments, systems/devices/methods described herein can provide two power management modes and introduce signaling to indicate the transition of power management modes and/or states of the WURx to STA1.

In some embodiments, the WURx of a STA may be in one of two power states. In an WURx awake state, the STA may receive wake-up receiver transmission, such as wake-up packets and/or beacons. In an WURx doze state, the STA does not receive wake-up receiver transmissions. For example, the WURx may be powered off to conserve power.

In some embodiments, the WURx of a STA may be operated in one of two power management modes. In an WURx active mode the STA remains in the WURx awake state to receive wake-up receiver transmissions. In the WURx power save mode, the STA enters the WURx awake state to receive wake-up receiver transmissions, and then otherwise remains in the WURx doze state.

In some embodiments, systems/devices/methods described herein provide rules to define the WURx state transition. In some embodiments, the WURx state transition is defined from the perspective of the other side, e.g., AP. In some embodiments, the STA may do localized operations even when the AP believes the WURx to be in a doze state. For example, if from the AP's perspective, the WURx is off, the STA may keep the WURx powered on to simplify the operation. In an example, the STA may not need to notify the AP. Specifically, when the STA is in the doze state from the AP's perspective, the STA may be in awake state to deal with other operations. As another example, when the STA is in awake state from AP's perspective, the STA may be in doze due to mechanism like intra-BSS PPDU power save.

In some embodiments, systems/devices/methods described herein may provide a rule for the relation of the WURx state and the power save state from AP's perspective. From the AP's perspective, if the STA is in the awake state, then AP shall treat the WURx of STA as off, e.g., the AP shall not send a wake-up packet to the STA. From the AP's perspective, if the STA is in the doze state, then the WURx status is determined by the power management mode of the STA. When the STA indicates it is operating in the WURx active mode, then the WURx is on. If STA indicates it is operating in the WURx Power save mode, then the state of the WURx is indicated based on the duty cycle signaling as described in some embodiments. The duty cycle is used to determine when the WURx is on or off.

In some embodiments, after the AP sends the wake-up packet the WURx state of the STA from AP's perspective does not change until the AP receives an acknowledgement from the STA for the wake-up packet. Until the acknowledgement is received, the state of the STA follows the existing signaling from the STA.

In some embodiments, the power save state of the STA from AP's perspective after AP sends the wake-up packet until AP gets acknowledgement from the STA for the wake-up packet is the doze state. In some embodiments, a benefit of this approach is that all the current 802.11 power save protocols is not changed.

Figure 7:
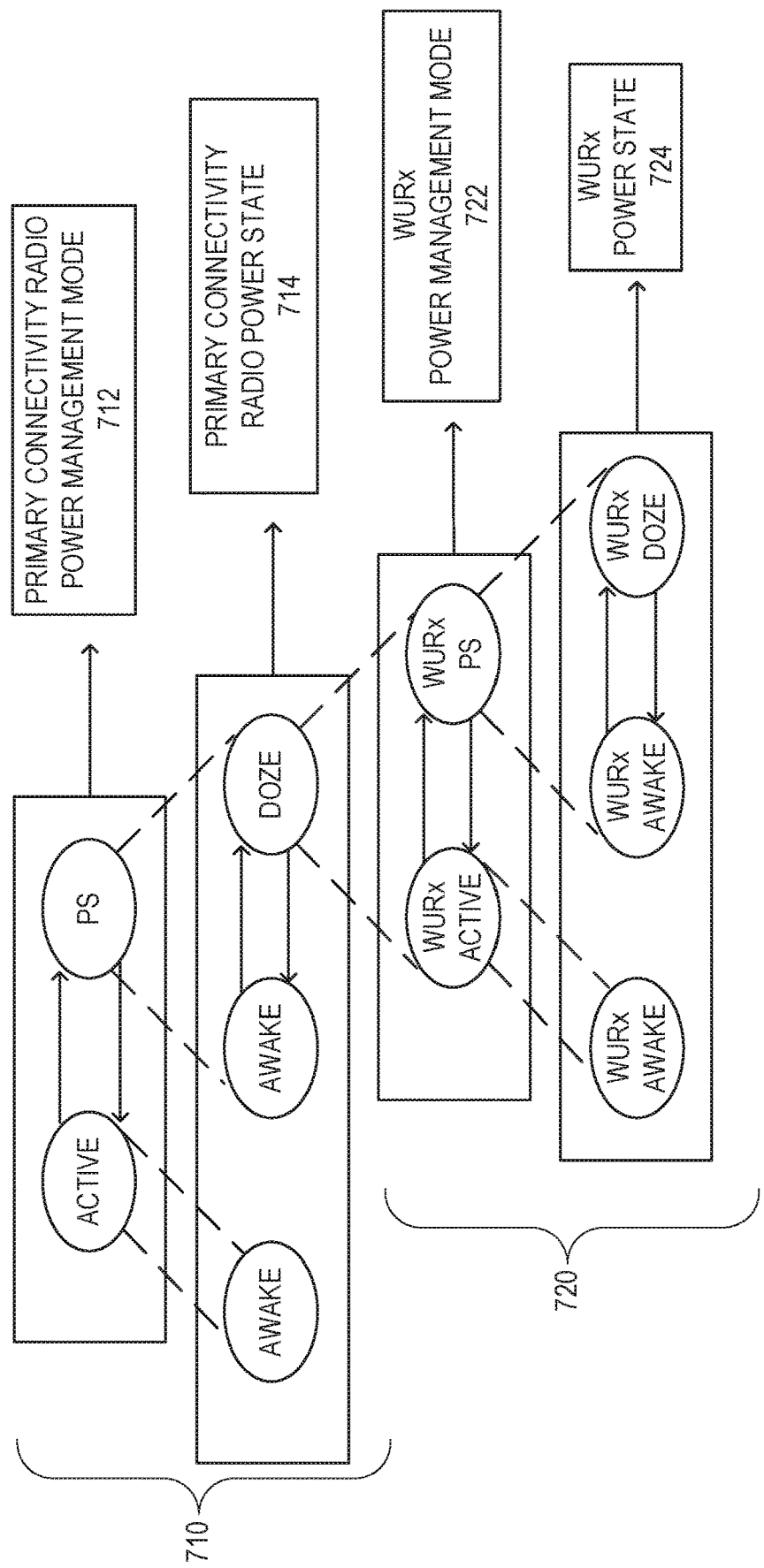
FIG. 7 illustrates an example of WUR state transition and the relation with power save, in accordance with some embodiments.

In some embodiments, systems/devices/methods described herein can be illustrated by FIG. 7. FIG. 7 illustrates an example of WURx state transition and the relation with power save, in accordance with some embodiments. FIG. 7 shows that a WURx state is defined when the power state of the STA is doze. In some embodiments, two power management modes for WURx are defined. In some embodiments, implementation may be eased by following a similar definition for IEEE 802.11 radio.

The STA has both a primary connectivity radio 710 and a WURx 720. Each of these have a power management mode and a power state. The power management mode of the primary connectivity radio 712 may be in either an active or power save mode. The power management mode determines the available power states of the primary connectivity radio 714. In the active state, the primary connectivity radio is in an awake state. When operating in the power save mode, the state of the primary connectivity radio may be either awake or doze. In the doze state, the WURx may be active and the mode and state of the WURx becomes important.

WURx power management modes 722 may be WURx active or WURx power save. In the WURx active mode, the WURx power state is WURx awake. In the WURx power save mode, the power state of the WURx 724 may be either in an WURx awake or WURx doze state. In the WURx awake state, the WURx may receive wake-up packets and/or other wake-up receiver data. In the WURx doze state, the WURx cannot receive wake-up packets and/or other wake-up receiver data and may be powered off. A duty cycle may determine when the WURx transitions between the WURx awake and WURx doze state.

Figure 8:
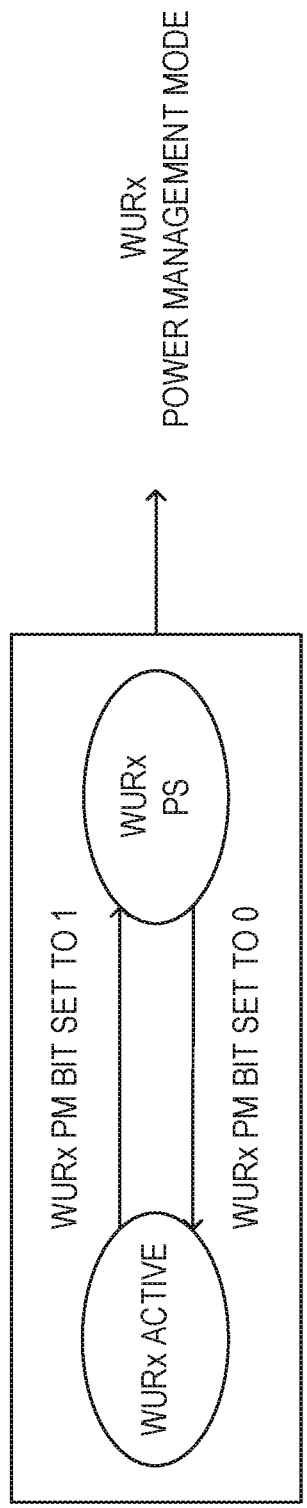
FIG. 8 illustrates an example of a transition of WURx Active and WURx Power save mode with additional signaling in WUR mode element, in accordance with some embodiments.
Figure 9:
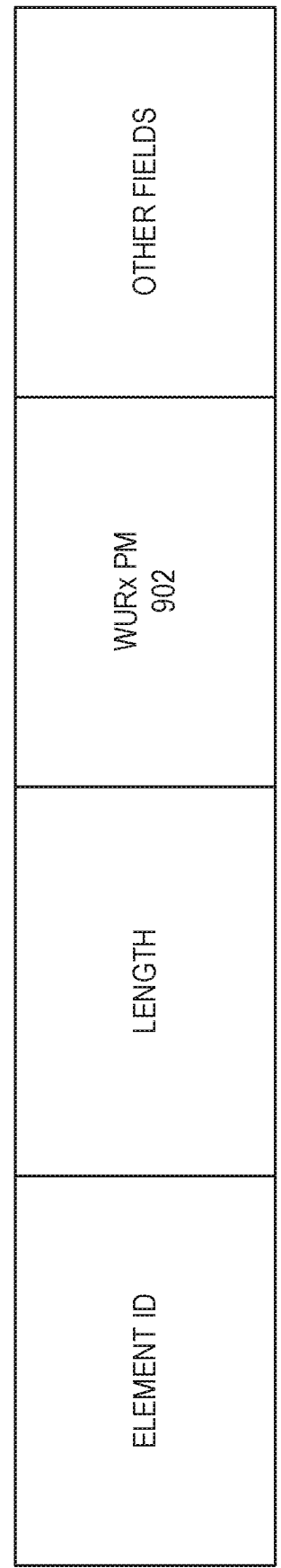
FIG. 9 illustrates an example of a WUR mode element, in accordance with some embodiments.

FIG. 8 illustrates an example of a transition of WURx Active and WURx Power save mode with additional signaling in WUR mode element, in accordance with some embodiments. FIG. 9 illustrates an example of a WUR mode element, in accordance with some embodiments. The WUR mode element, includes a WURx power mode bit 902 that indicates if the WURx is in the active or power save mode.

In some embodiments, systems/devices/methods described herein define two power management modes for a WURx and define the corresponding WURx state transitions from the AP's perspective. In some embodiments, systems/devices/methods described herein may be written with general language that can enable working for a device-to-device (D2D) model.

In some embodiments, the STA2 and STA1 may negotiate the wake-up radio (WUR) capability of STA1. STA2 may send a wake-up packet to wake up the STA1 to have the STA1 begin its transition of the STA1's primary connectivity radio power state to the awake mode to receive data from the STA2. In some embodiments, the WURx of a STA may be in one of two power states. In an WURx Awake state, the STA may receive wake-up receiver (WUR) transmissions. The second state is WURx Doze state where the STA cannot receive wake-up receiver transmissions. There may also be two power management modes. In a WURx Active mode the STA remains in the WURx awake state to receive WUR transmission. In a WURx Power save mode the STA enters the WURx awake state to receive WUR transmission. The STA remains in the WURx doze state otherwise.

The STA may indicate the power management mode of the WURx through the WUR mode element as defined in some embodiments. One bit in the WUR mode element may be used for the signaling, see FIG. 8. This bit may be called the WURx Power Management bit, and may be set to 1 to indicate the WURx Power save mode, or set to 0 to indicate the WURx Active mode.

In some embodiments, the WURx state of a STA1 is defined from the perspective of a STA2, e.g., an AP. If the primary connectivity radio of STA1 is in awake state from STA2's perspective, then the WURx state of STA1 from STA2's perspective is off. The rule may also be defined as if the primary connectivity radio of STA1 is in awake state from STA2's perspective, then STA2 shall not send wake-up packets to the STA1. Essentially, this means that STA1 may do whatever it wants for the WURx state if STA1 is in awake state from STA2's perspective. For example, the STA1 may turn off the WURx. In another example, for ease of implementation the WURx may be left powered on.

If the primary connectivity radio of the STA1 is in a doze state from STA2's perspective, then the WURx state of STA1 from STA2's perspective is determined by the duty cycle signaling as described in some embodiments. If the duty cycle period indicates on, then WURx is on, e.g., in the WURx awake state. If duty cycle period indicates off, then WURx is off. If there is no duty cycle signaling, then WURx is off if there is no other indication for the WURx on signaling.

If the primary connectivity radio of the STA1 is in a doze state from STA2's perspective, then the WURx state of STA1 from STA2's perspective is determined by the WURx power management mode of the STA. If STA1 indicates in WURx Active mode, then WURx is on. If STA1 indicates WURx Power save mode, then the state of the WURx is indicated based on the duty cycle signaling as described in some embodiments. If the duty cycle period indicates on, then WURx is on, e.g., in the WURx awake state. If duty cycle period indicates off, then WURx is off. If there is no duty cycle signaling, then WURx is off if there is no other indication for the WURx on signaling.

In some embodiments, the WURx state of STA1 from STA2's perspective after STA2 sends the wake-up packet may be clarified. In some embodiments, the WURx state of the STA1 from STA2's perspective after STA2 sends the wake-up packet until STA2 gets acknowledgement from the STA1 for the wake-up packet is determined by the WURx indication sent by STA1 before the wake-up packet is sent. In some embodiments, the power save state of the STA1 from STA2's perspective after STA2 sends the wake-up packet until STA2 gets acknowledgement from the STA1 for the wake-up packet is determined by power state indication sent by STA1 before the wake-up packet is sent. In other words, in these examples the state of STA1 from the perspective of the STA2 does not change until an acknowledgement is received.

Figure 10:
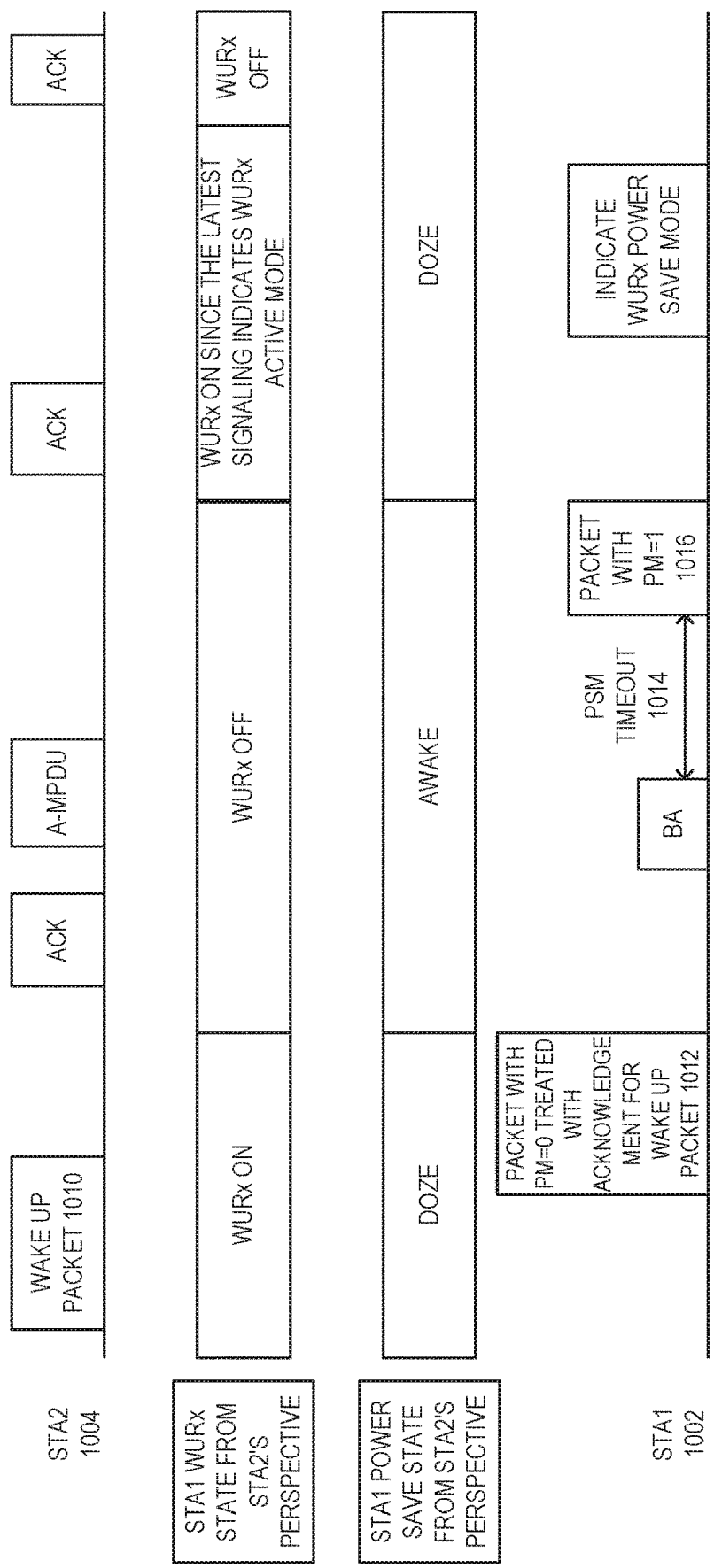
FIG. 10 illustrate an example of a power save protocol, in accordance with some embodiments.
Figure 11:
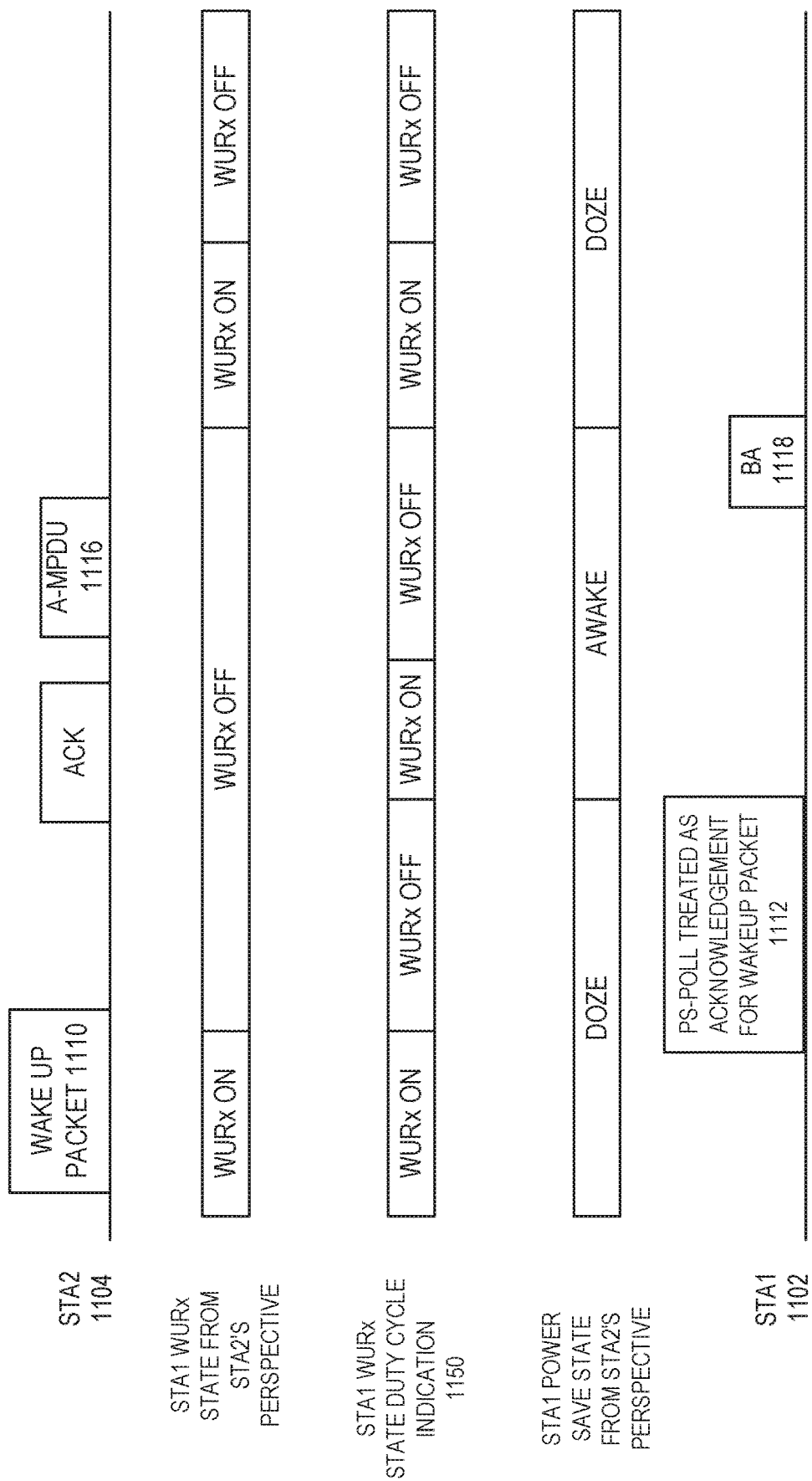
FIG. 11 illustrate an example of a power save protocol, in accordance with some embodiments.
Figure 12:
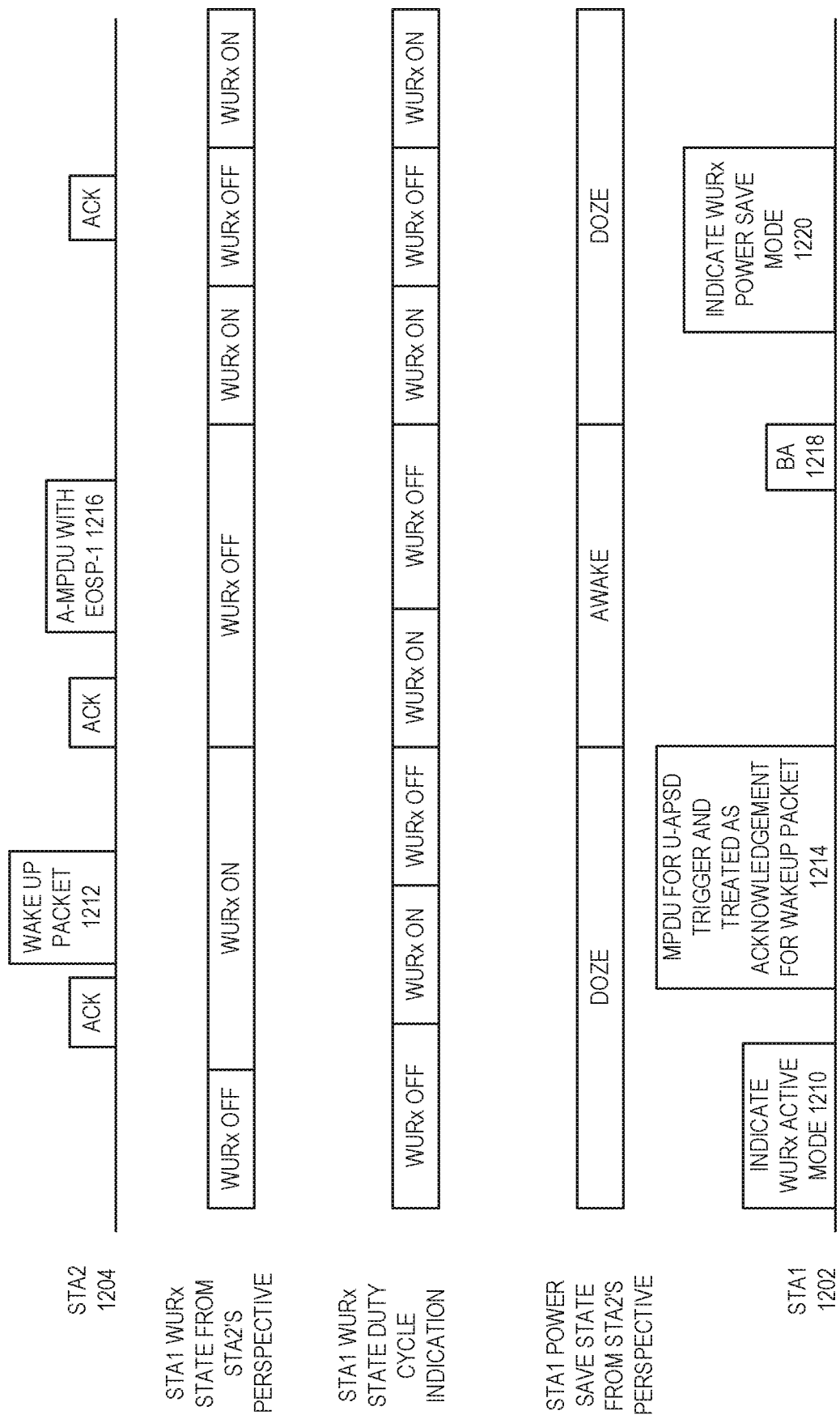
FIG. 12 illustrate an example of a power save protocol, in accordance with some embodiments.

In some embodiments, examples are provided in FIGS. 10-12 to illustrate the concept for three different power save protocols used in current IEEE 802.11 and explain how the concept works.

FIG. 10 illustrates an example of a power save protocol, in accordance with some embodiments. STA1 uses power save management bit to switch awake and doze state and retrieve packets from STA2. In some embodiments, STA1 uses dynamic signaling.

In some embodiments, before the STA2 sends a wake-up packet, the STA1 has indicated its WURx Active mode. The WURx state of STA1 from STA2's perspective is off when STA1 is in an awake state of the primary connectivity radio from STA2's perspective. The WURx state of STA1 from STA2's perspective is determined by the indication for WURx power management mode when STA1 is in power save mode from STA2's perspective.

In FIG. 10, a STA1 1002 has indicated its power management mode to a STA2 1004. In an example, STA2 sends a wake-up packet to STA1 1002. The STA1 1002 transitions out of the doze state based upon the wake-up packet. STA1 1002 sends a packet 1012 with the power management bit set to zero to STA2 1004. This packet acts as an acknowledgement of the wake-up packet 1010. Once the packet is received by STA2 1004, STA2 1004 treats STA1 as in the WURx off and awake state, such that STA1 may receive data 1016. After a power save mode (PSM) timeout 1014, the STA1 1002 may send a packet 1016 with the power management mode bit set to 1. Once this packet 1016 is received by the STA2 1004, STA2 1004 treats STA1 1002 as being in the doze state, with the WURx on and able to receive WUR transmissions.

FIG. 11 illustrates an example of a power save protocol, in accordance with some embodiments. In FIG. 11, a STA1 1102 uses a PS-Poll to retrieve packets from a STA2 1104. In some embodiments, the STA1 1102 uses duty cycle signaling.

In some embodiments, it can be assumed that before STA2 sends a wake-up packet 1110, the STA1 1102 has indicated its WURx power save mode and sent a duty cycle indication to the STA2 1104. The WURx state of STA1 1102 from the STA2's perspective is off when the STA1 1102 is awake from the STA2's perspective. The WURx state of STA1 1102 from the STA2's perspective is determined by the duty cycle indication when the STA1 is in the doze state from the STA2's perspective.

After the STA1 1102 receives the wake-up packet using its WURx, the STA1 1102 sends a PS-Poll message 1112 that is used to acknowledge the wake-up packet 1110. Once the PS-Poll message 1112 is received by the STA2 1104, the power mode state of STA1 1102 from the STA2's prospective is awake with the WURx off. This is true even though STA1's WURx is powered on and off based upon the duty cycle 1150. When STA2 1104 has STA1 1102 in the awake state data 1116 may be sent to the STA1 1102. An acknowledgement 1118 of the data may be used to indicate reception of the data and may be used to indicate the power save state of the STA1 1102 has transitioned to doze.

FIG. 12 illustrates an example of a power save protocol, in accordance with some embodiments. In FIG. 12 STA1 1202 uses a U-APSD to retrieve packets from STA2 1204. In some embodiments, the STA1 1202 uses both dynamic signaling and duty cycle signaling. In some embodiments, before the STA2 1204 sends a wake-up packet, the STA1 1202 has indicated its WURx power save mode and sent duty cycle indication to the STA2 1204. The WURx state of the STA1 1202 from STA2's perspective is off when the STA1 1202 is awake from the STA2's perspective. The WURx state of the STA1 1202 from the STA2's perspective is determined jointly by the duty cycle indication and WURx power save mode indication when the STA1 1202 is doze from STA2's perspective.

The STA1 1202 indicates it is in the WURx active mode. For example, by using the power mode indicator bit in a packet as shown in FIG. 8. Upon receipt by STA2 1204, STA1 1202 is treated as being in the WURx awake state and able to receive WUR transmissions. The primary connectivity radio may be disabled at this point. The STA2 1204 may send a wake-up packet 1212 to the STA1 1202. An acknowledgement 1214 is sent from the STA1 1202 and upon receipt by the STA2 1204, the power state of the STA1 1202 is treated as being awake, such that the primary connectivity radio is enabled and the STA1 1202 is able to receive data 1216. An acknowledgement of the data 1218 may be treated as a transition back to the doze state. The STA1 1202 may also send an indication of its power save mode 1220. This is true even though the STA2 1204 is treating the STA1 1202 as in the doze state.

Figure 13:
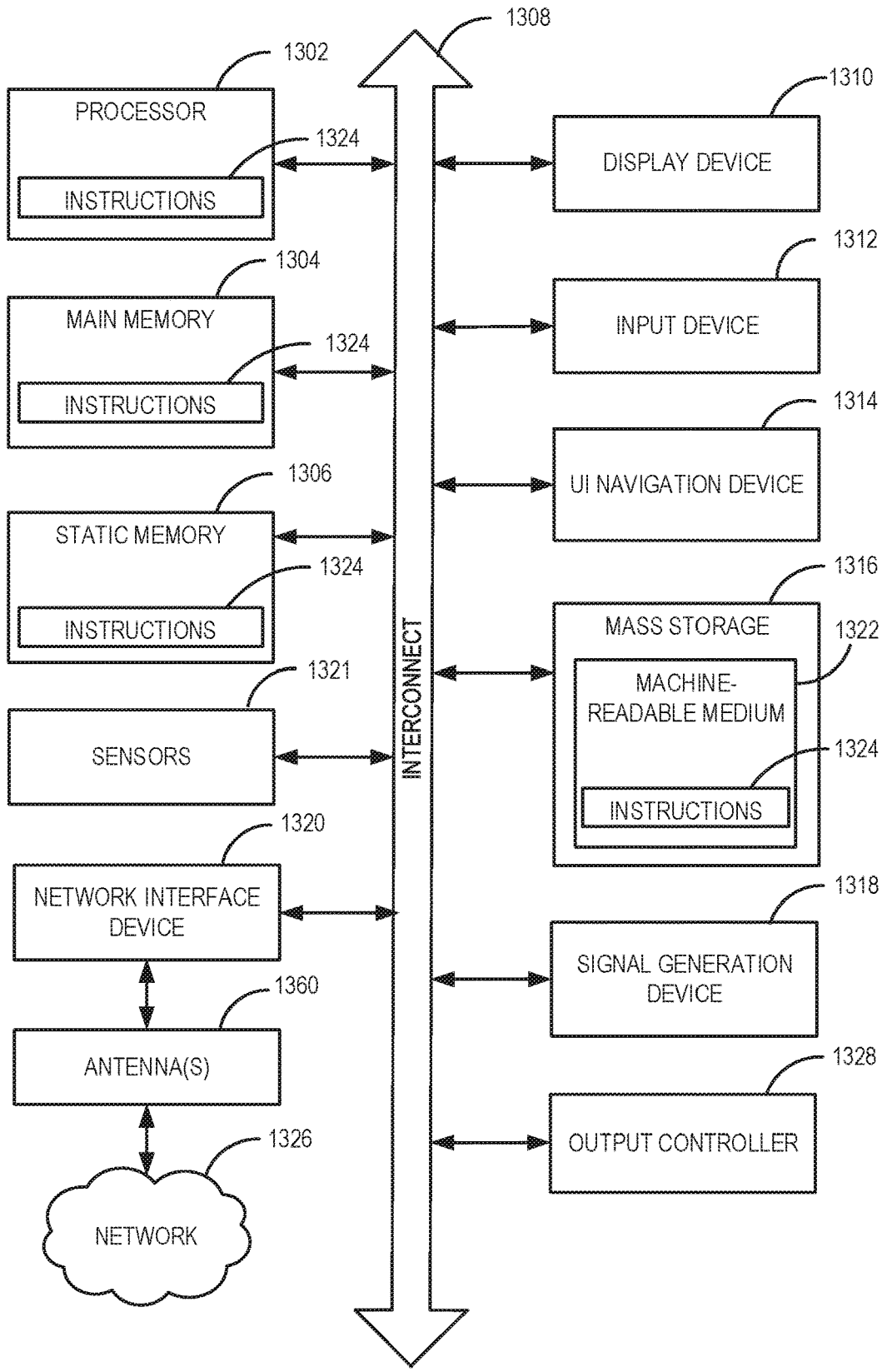
FIG. 13 illustrates a block diagram of an example machine upon which any one or more of the operations/techniques (e.g., methodologies) discussed herein may perform.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked)

to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308.

Specific examples of main memory 1304 include Random Access Memory (RAM), and semiconductor memory devices, which may include, in some embodiments, storage locations in semiconductors such as registers. Specific examples of static memory 1306 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1300 may further include a display device 1310, an input device 1312 (e.g., a keyboard), and a user interface (UI) navigation device 1314 (e.g., a mouse). In an example, the display device 1310, input device 1312 and UI navigation device 1314 may be a touch screen display. The machine 1300 may additionally include a mass storage (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1302 and/or instructions 1324 may comprise processing circuitry and/or transceiver circuitry.

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1322 is illustrated as a single medium, the term "machine readable medium" may include a single medium or multiple media (e.g., a centralized or distributed database, and/or associated caches and servers) configured to store the one or more instructions 1324.

An apparatus of the machine 1300 may be one or more of a hardware processor 1302 (e.g., a central processing unit (CPU), a graphics processing unit (GPU), a hardware processor core, or any combination thereof), a main memory 1304 and a static memory 1306, sensors 1321, network interface device 1320, antennas 1360, a display device 1310, an input device 1312, a UI navigation device 1314, a mass storage 1316, instructions 1324, a signal generation device 1318, and an output controller 1328. The apparatus may be configured to perform one or more of the methods and/or operations disclosed herein. The apparatus may be intended as a component of the machine 1300 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1320 may include one or more physical jacks (e.g., Ethernet, coaxial, or phone jacks) or one or more antennas to connect to the communications network 1326. In an example, the network interface device 1320 may include one or more antennas 1360 to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the machine 1300, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 14:
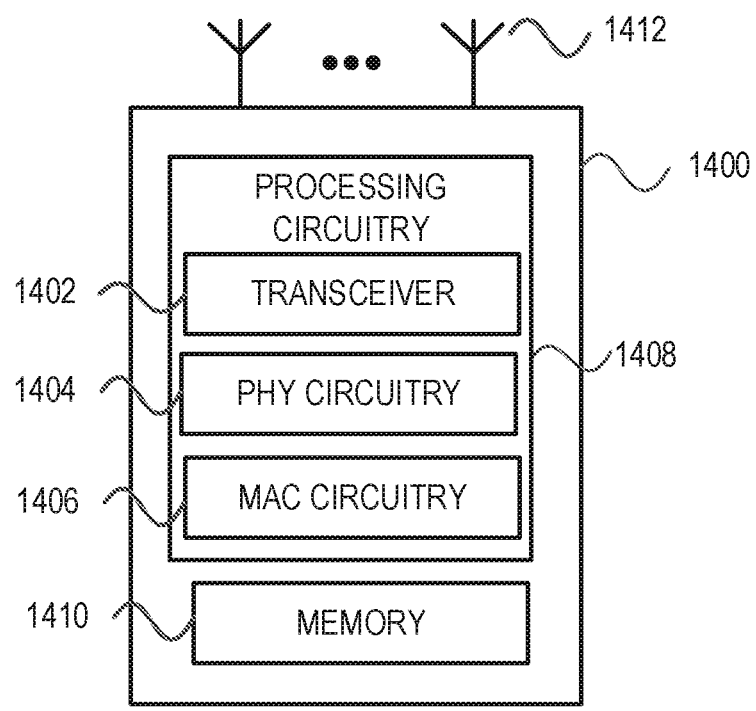
FIG. 14 illustrates a block diagram of an example wireless device upon which any one or more of the techniques (e.g., methodologies or operations) discussed herein may perform.

FIG. 14 illustrates a block diagram of an example wireless device 1400 upon which any one or more of the techniques (e.g., methodologies or operations) discussed herein may perform. The wireless device 1400 may be a HE device. The wireless device 1400 may be a HE STA 504 and/or HE AP 502 (e.g., FIG. 5). A HE STA 504 and/or HE AP 502 may include some or all of the components shown in FIGS. 1-5 and 13. The wireless device 1400 may be an example machine 1300 as disclosed in conjunction with FIG. 13.

The wireless device 1400 may include processing circuitry 1408. The processing circuitry 1408 may include a transceiver 1402, physical layer circuitry (PHY circuitry) 1404, and MAC layer circuitry (MAC circuitry) 1406, one or more of which may enable transmission and reception of signals to and from other wireless devices 1400 (e.g., HE AP 502, HE STA 504, and/or legacy devices 506) using one or more antennas 1412. As an example, the PHY circuitry 1404 may perform various encoding and decoding functions that may include formation of baseband signals for transmission and decoding of received signals. As another example, the transceiver 1402 may perform various transmission and reception functions such as conversion of signals between a baseband range and a Radio Frequency (RF) range.

Accordingly, the PHY circuitry 1404 and the transceiver 1402 may be separate components or may be part of a combined component, e.g., processing circuitry 1408. In addition, some of the described functionality related to transmission and reception of signals may be performed by a combination that may include one, any or all of the PHY circuitry 1404 the transceiver 1402, MAC circuitry 1406, memory 1410, and other components or layers. The MAC circuitry 1406 may control access to the wireless medium. The wireless device 1400 may also include memory 1410 arranged to perform the operations described herein, e.g., some of the operations described herein may be performed by instructions stored in the memory 1410.

The antennas 1412 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1412 may be effectively separated to take advantage of spatial diversity and the different channel characteristics that may result.

One or more of the memory 1410, the transceiver 1402, the PHY circuitry 1404, the MAC circuitry 1406, the antennas 1412, and/or the processing circuitry 1408 may be coupled with one another. Moreover, although memory 1410, the transceiver 1402, the PHY circuitry 1404, the MAC circuitry 1406, the antennas 1412 are illustrated as separate components, one or more of memory 1410, the transceiver 1402, the PHY circuitry 1404, the MAC circuitry 1406, the antennas 1412 may be integrated in an electronic package or chip.

In some embodiments, the wireless device 1400 may be a mobile device as described in conjunction with FIG. 13. In some embodiments the wireless device 1400 may be configured to operate in accordance with one or more wireless communication standards as described herein (e.g., as described in conjunction with FIGS. 1-5 and 13, IEEE 802.11). In some embodiments, the wireless device 1400 may include one or more of the components as described in conjunction with FIG. 13 (e.g., display device 1310, input device 1312, etc.) Although the wireless device 1400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 1400 may include various components of the wireless device 1400 as shown in FIG. 14 and/or components from FIGS. 1-5 and 13. Accordingly, techniques and operations described herein that refer to the wireless device 1400 may be applicable to an apparatus for a wireless device 1400 (e.g., HE AP 502 and/or HE STA 504), in some embodiments. In some embodiments, the wireless device 1400 is configured to decode and/or encode signals, packets, and/or frames as described herein, e.g., PPDUs.

In some embodiments, the MAC circuitry 1406 may be arranged to contend for a wireless medium during a contention period to receive control of the medium for a HE TXOP and encode or decode an HE PPDU. In some embodiments, the MAC circuitry 1406 may be arranged to contend for the wireless medium based on channel contention settings, a transmitting power level, and a clear channel assessment level (e.g., an energy detect level).

The PHY circuitry 1404 may be arranged to transmit signals in accordance with one or more communication standards described herein. For example, the PHY circuitry 1404 may be configured to transmit a HE PPDU. The PHY circuitry 1404 may include circuitry for modulation/demodulation, upconversion/downconversion, filtering, amplification, etc. In some embodiments, the processing circuitry 1408 may include one or more processors. The processing circuitry 1408 may be configured to perform functions based on instructions being stored in a RAM or ROM, or based on special purpose circuitry. The processing circuitry 1408 may include a processor such as a general purpose processor or special purpose processor. The processing circuitry 1408 may implement one or more functions associated with antennas 1412, the transceiver 1402, the PHY circuitry 1404, the MAC circuitry 1406, and/or the memory 1410. In some embodiments, the processing circuitry 1408 may be configured to perform one or more of the functions/operations and/or methods described herein.

In mmWave technology, communication between a station (e.g., the HE stations 504 of FIG. 5 or wireless device 1400) and an access point (e.g., the HE AP 502 of FIG. 5 or wireless device 1400) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $\frac{1}{10}$ of a wavelength or more.

ADDITIONAL NOTES AND EXAMPLES

Example 1 is an apparatus of a station (STA) comprising: memory; and processing circuitry to: encode duty cycle timing for transmission to a second station via a primary connectivity radio; enable a wake-up radio (WUR) receiver (WURx) to receive a transmission based upon the duty cycle timing of the WURx when the primary connectivity radio is in a doze state from a perspective of the second station; decode a wake-up packet, received from the second station, received by the WURx, the WURx receives a WURx transmission when in an WURx awake state; and enable the primary connectivity radio based upon decoding the wake-up packet.

In Example 2, the subject matter of Example 1 includes, wherein the processing circuitry is further configured to: encode an acknowledgement for transmission from the primary connectivity radio, the primary connectivity radio in an awake state from a perspective of the section station upon reception of the acknowledgement; decode a MAC protocol data unit (MPDU) received from the second station; encode an acknowledgement to the MPDU; disable the primary connectivity radio based upon the acknowledgement; and enable the WURx based upon the duty cycle timing.

In Example 3, the subject matter of Examples 1-2 includes, the WURx, the WURx decodes the wake-up packet.

In Example 4, the subject matter of Example 3 includes, the primary connectivity radio.

In Example 5, the subject matter of Examples 1-4 includes, wherein the processing circuitry further configured to encode a frame including a WUR mode element that indicates a power management mode of the WURx through the primary connectivity radio to control the duty cycle timing.

In Example 6, the subject matter of Example 5 includes, wherein the power management mode comprises one of a WURx active mode and a WURx power save mode.

In Example 7, the subject matter of Example 6 includes, the power management mode is WURx power save, and the WURx is on based upon the duty cycle.

In Example 8, the subject matter of Examples 6-7 includes, the power management mode is WURx active mode, and the WURx is on regardless of the duty cycle.

In Example 9, the subject matter of Examples 1-8 includes, wherein the second station is an access point (AP).

In Example 10, the subject matter of Examples 1-9 includes, wherein the processing circuitry is further configured to disable the WURx based upon decoding the wake-up packet.

In Example 11, the subject matter of Examples 1-10 includes, wherein the duty cycle is stored in the memory.

Example 12 is a non-transitory computer-readable medium comprising instructions to cause a station (STA), upon execution of the instructions by processing circuitry of the STA, to: encode duty cycle timing for transmission to a second station via a primary connectivity radio; enable a wake-up radio (WUR) receiver (WURx) to receive a transmission based upon the duty cycle timing of the WURx when the primary connectivity radio is in a doze state from a perspective of the second station; decode a wake-up packet, received from the second station, received by the WURx, the WURx receives a WURx transmission when in an WURx awake state; and enable the primary connectivity radio based upon decoding the wake-up packet.

In Example 13, the subject matter of Example 12 includes, wherein the instructions further cause the STA to: encode an acknowledgement for transmission from the primary connectivity radio, the primary connectivity radio in an awake state from a perspective of the section station upon reception of the acknowledgement; decode a MAC protocol data unit (MPDU) received from the second station; encode an acknowledgement to the MPDU; disable the primary connectivity radio based upon the acknowledgement; and enable the WURx based upon the duty cycle timing.

In Example 14, the subject matter of Examples 12-13 includes, the WURx decodes the wake-up packet.

In Example 15, the subject matter of Examples 12-14 includes, wherein the instructions further cause the STA to encode a frame including a WUR mode element that indicates a power management mode of the WURx through the primary connectivity radio to control the duty cycle timing.

In Example 16, the subject matter of Example 15 includes, wherein the power management mode comprises one of a WURx active mode and a WURx power save mode.

In Example 17, the subject matter of Example 16 includes, the power management mode is WURx power save, and the WURx is on based upon the duty cycle.

In Example 18, the subject matter of Examples 16-17 includes, the power management mode is WURx active, and the WURx is on regardless of the duty cycle.

In Example 19, the subject matter of Examples 12-18 includes, wherein the second station is an access point (AP).

In Example 20, the subject matter of Examples 12-19 includes, wherein the instructions further cause the STA to disable the WURx based upon decoding the wake-up packet.

Example 21 is an apparatus of a station (STA) comprising: memory; and processing circuitry to: decode duty cycle timing received from a second station; determine a wake-up radio (WUR) receiver (WURx) of the second station is in an awake state based upon the duty cycle timing; and encode a wake-up packet, for transmission to the second station, based upon the WURx of the second station being in the awake state, wherein a primary connectivity radio of the second station is enabled based upon decoding the wake-up packet.

In Example 22, the subject matter of Example 21 includes, wherein the processing circuitry is further configured to: decode an acknowledgement for transmission from the primary connectivity radio, the primary connectivity radio in an awake state from a perspective of the station upon reception of the acknowledgement; encode a MAC protocol data unit (MPDU) for the second station; and decode an acknowledgement to the MPDU, wherein the primary connectivity radio of the second station is disabled based upon the acknowledgement, and the WURx is enabled based upon the duty cycle timing.

In Example 23, the subject matter of Example 22 includes, wherein the processing circuitry is further configured to decode a frame including a WUR mode element that indicates a power management mode of the WURx to control the duty cycle timing.

In Example 24, the subject matter of Example 23 includes, wherein the power management mode comprises one of a WURx active mode and a WURx power save mode.

In Example 25, the subject matter of Example 24 includes, the power management mode is WURx power save, and the WURx is on based upon the duty cycle.

In Example 26, the subject matter of Examples 24-25 includes, the power management mode is WURx active mode, and the WURx is on regardless of the duty cycle.

In Example 27, the subject matter of Examples 21-26 includes, wherein the station is an access point (AP).

Example 28 is a non-transitory computer-readable medium comprising instructions to cause a station (STA), upon execution of the instructions by processing circuitry of the STA, to: decode duty cycle timing received from a second station; determine a wake-up radio (WUR) receiver (WURx) of the second station is in an awake state based upon the duty cycle timing; and encode a wake-up packet, for transmission to the second station based upon the WURx of the second station being in the awake state, wherein a primary connectivity radio of the second station is enabled based upon decoding the wake-up packet.

In Example 29, the subject matter of Example 28 includes, wherein the instructions further cause the STA to: decode an acknowledgement for transmission from the primary connectivity radio, the primary connectivity radio in an awake state from a perspective of the station upon reception of the acknowledgement; encode a MAC protocol data unit (MPDU) for the second station; and decode an acknowledgement to the MPDU, wherein the primary connectivity radio of the second station is disabled based upon the acknowledgement, and the WURx is enabled based upon the duty cycle timing.

In Example 30, the subject matter of Example 29 includes, wherein the instructions further cause the STA to decode a frame including a WUR mode element that indicates a power management mode of the WURx to control the duty cycle timing.

In Example 31, the subject matter of Example 30 includes, wherein the power management mode comprises one of a WURx active mode and a WURx power save mode.

In Example 32, the subject matter of Example 31 includes, the power management mode is WURx power save, and the WURx is on based upon the duty cycle.

In Example 33, the subject matter of Examples 31-32 includes, the power management mode is WURx active mode, and the WURx is on regardless of the duty cycle.

In Example 34, the subject matter of Examples 28-33 includes, wherein the station is an access point (AP).

Example 35 is at least one machine-readable medium including instructions that, when executed by processing circuitry, cause the processing circuitry to perform operations to implement of any of Examples 1-34.

Example 36 is an apparatus comprising means to implement of any of Examples 1-34.

Example 37 is a system to implement of any of Examples 1-34.

Example 38 is a method to implement of any of Examples 1-34. The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a non-access point (AP) station (non-AP STA), the apparatus comprising:
   memory; and
   processing circuitry to:
   encode a first frame for transmission to an AP, the first frame indicating that the non-AP STA is a wake-up radio (WUR) non-AP STA, the first frame indicating WUR capabilities of the non-AP STA;
   encode a second frame for transmission to the AP, the second frame comprising a WUR mode element indicating that the non-AP STA is requesting to enter WUR mode, the WUR mode element indicating duty cycle timing, including a duty cycle period, for operating in the WUR mode;
   wherein when the non-AP STA is in the WUR mode, the processing circuitry is configured to cause the non-AP STA to transition between a WUR awake state and a WUR doze state in accordance with the duty cycle timing,
   wherein when the non-AP STA is not in the WUR mode, the processing circuitry is configured to cause the non-AP STA to be in a non-WUR awake state and refrain from transiting between the WUR awake state and the WUR doze state,
   wherein when the non-AP STA is in the WUR mode, the processing circuitry is configured to enable the non-AP STA to receive a WUR wake-up frame from the AP when the non-AP STA is in the WUR awake state, the WUR awake state being a receive only state,
   wherein during the WUR doze state, the non-AP STA is not able to receive the WUR wake-up frame, and
   wherein in response to receipt of the WUR wake-up frame, the processing circuitry is configured to exit WUR mode and transition the non-AP STA from the WUR awake state to the non-WUR awake state.

2. The apparatus of claim 1, wherein after transition to the non-WUR awake state, the processing circuitry is to configure the non-AP STA to receive buffered data from the AP, the non-WUR awake state being an active state of the non-AP STA.

3. The apparatus of claim 2, wherein in response to the WUR wake-up frame, the processing circuitry is configured to encode a third frame for transmission to the AP indicating that the non-AP STA is in the non-WUR awake state.

4. The apparatus of claim 3, wherein the processing circuitry is further configured to encode the first frame to include a time that the non-AP station takes to transition from the WUR awake state to the non-WUR awake state.

5. The apparatus of claim 4 wherein in response to receipt of the WUR wake-up frame, the processing circuitry is configured to transition the non-AP STA from the WUR awake state to the non-WUR awake state at a predetermined time.

6. The apparatus of claim 1 wherein the processing circuitry is further configured to decode a trigger frame received from the AP after transitioning to the non-WUR awake state.

7. The apparatus of claim 6 wherein the processing circuitry comprises a baseband processor to generate baseband signals, and
   wherein the memory is configured to store the WUR mode element.

8. The apparatus of claim 7, further comprising a direct conversion mixer, the direct conversion mixer configured to directly downconvert RF signals to baseband signals for the baseband processor, wherein the processing circuitry is configured to decode the baseband signals, the baseband signals including the trigger frame received from the AP.

9. The apparatus of claim 7, further comprising a super-heterodyne mixer, the super-heterodyne mixer configured to downconvert RF signals to intermediate frequency signals prior to generation of baseband signals,
wherein the processing circuitry is configured to decode the baseband signals, the baseband signals including the trigger frame.

10. The apparatus of claim 6 further comprising: mixer circuitry to downconvert RF signal to baseband signals; and
synthesizer circuitry, the synthesizer circuitry comprising one of a fractional-N synthesizer or a fractional N/N+1 synthesizer, the synthesizer circuitry configured to generate an output frequency for use by the mixer circuitry,
wherein the processing circuitry is configured to decode the baseband signals, the baseband signals including the trigger frame.

11. The apparatus of claim 6 further comprising: mixer circuitry to downconvert RF signal to baseband signals; and
synthesizer circuitry, the synthesizer circuitry comprising a delta-sigma synthesizer, the synthesizer circuitry configured to generate an output frequency for use by the mixer circuitry,
wherein the processing circuitry is configured to decode the baseband signals, the baseband signals including the trigger frame.

12. The apparatus of claim 6, further comprising transceiver circuitry coupled to the processing circuitry, the transceiver circuitry coupled to two or more antennas for receiving signalling in accordance with a multiple-input multiple-output (MIMO) technique.

13. A non-transitory computer-readable storage medium that stores instructions for execution by processing circuitry of non-access point (AP) station (non-AP STA) to configure the non-AP STA to perform operations to:
encode a first frame for transmission to an AP, the first frame indicating that the non-AP STA is a wake-up radio (WUR) non-AP STA, the first frame indicating WUR capabilities of the non-AP STA;
encode a second frame for transmission to the AP, the second frame comprising a WUR mode element indicating that the non-AP STA is requesting to enter WUR mode, the WUR mode element indicating duty cycle timing, including a duty cycle period, for operating in the WUR mode;

wherein when the non-AP STA is in the WUR mode, the processing circuitry is configured to cause the non-AP STA to transition between a WUR awake state and a WUR doze state in accordance with the duty cycle timing,
wherein when the non-AP STA is not in the WUR mode, the processing circuitry is configured to cause the non-AP STA to be in a non-WUR awake state and refrain from transiting between the WUR awake state and the WUR doze state,
wherein when the non-AP STA is in the WUR mode, the processing circuitry is configured to enable the non-AP STA to receive a WUR wake-up frame from the AP when the non-AP STA is in the WUR awake state, the WUR awake state being a receive only state,
wherein during the WUR doze state, the non-AP STA is not able to receive the WUR wake-up frame, and
wherein in response to receipt of the WUR wake-up frame, the processing circuitry is configured to exit WUR mode and transition the non-AP STA from the WUR awake state to the non-WUR awake state.

14. The non-transitory computer-readable storage medium of claim 13, wherein after transition to the non-WUR awake state, the processing circuitry is to configure the non-AP STA to receive buffered data from the AP, the non-WUR awake state being an active state of the non-AP STA.

15. The non-transitory computer-readable storage medium of claim 14, wherein in response to the WUR wake-up frame, the processing circuitry is configured to encode a third frame for transmission to the AP indicating that the non-AP STA is in the non-WUR awake state.

16. The non-transitory computer-readable storage medium of claim 15, wherein the processing circuitry is further configured to encode the first frame to include a time that the non-AP station takes to transition from the WUR awake state to the non-WUR awake state.

17. The non-transitory computer-readable storage medium of claim 16 wherein in response to receipt of the WUR wake-up frame, the processing circuitry is configured to transition the non-AP STA from the WUR awake state to the non-WUR awake state at a predetermined time.

18. The non-transitory computer-readable storage medium of claim 13 wherein the processing circuitry is further configured to decode a trigger frame received from the AP after transitioning to the non-WUR awake state.

* * * * *